United States Patent
Onoda et al.

(10) Patent No.: US 9,631,514 B2
(45) Date of Patent: Apr. 25, 2017

(54) AXIAL-FLOW TURBINE AND POWER PLANT INCLUDING THE SAME

(71) Applicant: KABUSHIKI KAISHA TOSHIBA, Minato-ku (JP)

(72) Inventors: Akihiro Onoda, Yokohama (JP); Yuki Mimura, Yokohama (JP); Shoko Ito, Sagamihara (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 529 days.

(21) Appl. No.: 14/183,753

(22) Filed: Feb. 19, 2014

(65) Prior Publication Data
US 2014/0250859 A1    Sep. 11, 2014

(30) Foreign Application Priority Data

Mar. 11, 2013   (JP) .................................. 2013-048114

(51) Int. Cl.
*F02C 3/34*    (2006.01)
*F02C 7/18*    (2006.01)
(Continued)

(52) U.S. Cl.
CPC ............ *F01D 25/12* (2013.01); *F01D 11/025* (2013.01); *F01D 11/001* (2013.01); *F01D 11/02* (2013.01);
(Continued)

(58) Field of Classification Search
CPC .......... F01D 9/041; F01D 25/12; F01D 9/065; F01D 9/04; F01D 1/02; F01D 1/023;
(Continued)

(56) References Cited

U.S. PATENT DOCUMENTS 2,896,906 A * 7/1959 Durkin .................... F01D 25/12
                                                           415/115
3,429,557 A * 2/1969 Brandon ................... F01D 5/08
                                                           415/168.4
(Continued)

FOREIGN PATENT DOCUMENTS

DE          914 608 C       7/1954
GB          262784 A        5/1927
JP          56-159508 A     12/1981

OTHER PUBLICATIONS

Japanese Office Action issued Jun. 3, 2016 in Patent Application No. 2013-048114 (with English language translation).
(Continued)

*Primary Examiner* — Christopher Besler
*Assistant Examiner* — Bayan Salone
(74) *Attorney, Agent, or Firm* — Oblon, McClelland, Maier & Neustadt, L.L.P.

(57) ABSTRACT

An axial-flow turbine according to an embodiment includes a plurality of nozzle structures and a plurality of blade structures. At least one nozzle structure includes an outer ring diaphragm and an inner ring diaphragm. The outer ring diaphragm and the inner ring diaphragm form an annular opening portion which extends in a circumferential direction therebetween. A nozzle is provided in a portion of a region of the annular opening portion in the circumferential direction, and a closing part is provided in another portion of the region of the annular opening portion in the circumferential direction. The closing part closes this other portion of the region to prevent a working fluid from flowing into this other portion of the region. A closing part medium passage is provided in the closing part and is configured to flow a cooling medium which cools the closing part.

15 Claims, 9 Drawing Sheets

(51) Int. Cl.
| | |
|---|---|
| *F02C 7/10* | (2006.01) |
| *F02C 9/20* | (2006.01) |
| *F01D 9/06* | (2006.01) |
| *F02C 3/20* | (2006.01) |
| *F02C 3/22* | (2006.01) |
| *F02C 3/24* | (2006.01) |
| *F01K 7/16* | (2006.01) |
| *F01K 7/18* | (2006.01) |
| *F01K 7/20* | (2006.01) |
| *F01K 11/02* | (2006.01) |
| *F01D 1/02* | (2006.01) |
| *F01D 25/12* | (2006.01) |
| *F01D 17/14* | (2006.01) |
| *F02C 7/12* | (2006.01) |
| *F02C 3/13* | (2006.01) |
| *F02C 9/18* | (2006.01) |
| *F01D 11/00* | (2006.01) |
| *F02C 9/22* | (2006.01) |
| *F01D 11/02* | (2006.01) |

(52) U.S. Cl.
CPC .......... *F01D 17/141* (2013.01); *F01D 17/143* (2013.01); *F01D 17/145* (2013.01); *F02C 3/13* (2013.01); *F02C 7/12* (2013.01); *F02C 7/18* (2013.01); *F02C 9/18* (2013.01); *F02C 9/20* (2013.01); *F02C 9/22* (2013.01); *F05D 2260/20* (2013.01); *F05D 2260/61* (2013.01); *Y02E 20/18* (2013.01); *Y02E 20/185* (2013.01)

(58) Field of Classification Search
CPC .... F01D 17/141; F01D 17/143; F01D 17/145; F01D 11/001; F01D 11/02; F02C 7/125; F02C 3/34; F02C 3/24; F02C 3/22; F02C 3/13; F02C 7/18; F02C 7/185; F02C 7/10; F02C 7/12; F02C 9/18; F02C 9/20; F02C 9/22; F01K 7/16; F01K 7/165; F01K 7/18; F01K 7/20; F01K 11/02; F01K 23/16; F05D 2260/20; F05D 2260/61; F05D 2260/611; Y02E 20/18; Y02E 20/185

USPC ...... 60/39.12, 39.5, 39.511, 39.52, 784, 785, 60/806, 805; 415/108, 115–117, 191, 415/199.5; 416/96 R, 97 R
See application file for complete search history.

(56) References Cited

U.S. PATENT DOCUMENTS

| | | | | |
|---|---|---|---|---|
| 4,571,935 | A * | 2/1986 | Rice | F01D 5/185 60/39.182 |
| 4,780,057 | A * | 10/1988 | Silvestri, Jr. | F01D 17/18 415/185 |
| 5,253,976 | A * | 10/1993 | Cunha | F01D 5/182 415/114 |
| 5,397,217 | A * | 3/1995 | DeMarche | F01D 5/187 415/115 |
| 5,755,556 | A * | 5/1998 | Hultgren | F01D 5/085 416/96 R |
| 5,795,130 | A * | 8/1998 | Suenaga | F01D 5/084 416/95 |
| 6,195,979 | B1 * | 3/2001 | Fukuyama | F01D 5/06 415/115 |
| 6,267,556 | B1 | 7/2001 | Kikuchi et al. | |
| 6,334,756 | B1 * | 1/2002 | Akiyama | F01D 5/084 415/114 |
| 7,086,828 | B2 * | 8/2006 | Haje | F01D 25/14 415/115 |
| 8,556,576 | B2 * | 10/2013 | Wilson, Jr. | F01D 5/081 415/115 |
| 8,806,874 | B2 * | 8/2014 | Onoda | F01D 9/041 415/115 |
| 9,376,933 | B2 * | 6/2016 | Andersen | F01D 25/12 |
| 2001/0009643 | A1 * | 7/2001 | Kikuchi | F01D 25/243 415/198.1 |
| 2002/0150467 | A1 * | 10/2002 | Tanioka | F01D 11/24 415/115 |
| 2002/0172595 | A1 | 11/2002 | Kikuchi et al. | |
| 2004/0163394 | A1 * | 8/2004 | Marushima | F01D 25/12 60/806 |

OTHER PUBLICATIONS

Extended European Search Report issued Jun. 1, 2016 in Patent Application No. 14155838.7.

* cited by examiner

AXIAL-FLOW TURBINE AND POWER PLANT INCLUDING THE SAME

CROSS REFERENCE TO RELATED APPLICATIONS

The present invention is based on, and claims priority from, Japanese Patent Application No. 2013-048114 filed on Mar. 11, 2013, the entire contents of which are hereby incorporated by reference.

FIELD

Embodiments relate to an axial-flow turbine and a power plant including the axial-flow turbine.

BACKGROUND

In recent years, it is desired in the field of a power plant including an axial-flow turbine to improve power generation efficiency and also to suppress the amount of generated gas such as $CO_2$, $SO_x$, and $NO_x$, to suppress global warming.

In a thermal power plant using an axial-flow turbine such as a steam turbine or a gas turbine, as an effective technique to improve the power generation efficiency, the temperature of working fluid supplied to the axial-flow turbine, that is, the temperature of the turbine inlet, is raised.

Further, when a volumetric flow rate of the working fluid flowing into the axial-flow turbine is small, a throat area (minimum passage area) between nozzles (stator vanes) needs to be reduced. Consequently, the airfoil height of the nozzle needs to be designed small. In this case, the secondary flow becomes significant between the nozzles and the secondary loss increases, which may cause a drop in performance of the axial-flow turbine. For this reason, in the case when a volumetric flow rate of the working fluid is small, suppressing the drop in performance of the turbine as well as suppressing the secondary flow may be difficult.

In a steam turbine, when a volumetric flow rate of the working fluid is small, a so-called partial admission structure is applied to suppress the secondary flow. Generally, a plurality of nozzles is arranged in the whole circumference of an annular opening portion formed between an outer ring diaphragm and an inner ring diaphragm of the steam turbine. The working fluid flows into the whole circumference of the annular opening portion. On the contrary, the partial admission structure is a structure in which the working fluid flows into a portion of a region of the annular opening portion in the circumferential direction and another portion of the region is closed. That is, a plurality of nozzles is arranged in one portion of the region of the annular opening portion in the circumferential direction, and no nozzle is provided in second portion of the region. The second region is closed so that the working fluid will not flow there into. In this case, by changing the ratio of the closed region to the whole region of the annular opening portion, the height of the nozzle can be adjusted to be larger. Therefore, in the case when the volumetric flow rate of the working fluid is small, the secondary flow can be suppressed and the drop in performance of the axial-flow turbine can be suppressed. Generally, such partial admission structure is preferably used in a speed control stage of a steam turbine.

DETAILED DESCRIPTION OF THE INVENTION

An axial-flow turbine according to the embodiment includes a plurality of nozzle structures supported by a casing and a plurality of blade structures supported by a turbine rotor which is rotatable against the casing. The nozzle structure and the blade structure are arranged alternately in an axial direction of the turbine rotor. At least one nozzle structure among the plurality of nozzle structures includes an outer ring diaphragm supported by the casing, and an inner ring diaphragm provided in an inner circumferential side of the outer ring diaphragm. The outer ring diaphragm and the inner ring diaphragm form an annular opening portion which extends in a circumferential direction therebetween. A nozzle is provided in a portion of the region of the annular opening portion in the circumferential direction, and a closing part is provided in another portion of the region of the annular opening portion in the circumferential direction. The closing part closes this other portion of the region and prevents a working fluid from flowing into this other portion of the region. A closing part medium passage is provided in the closing part and is configured to flow a cooling medium which cools the closing part.

Further, a power plant according to the embodiment includes an oxygen producing apparatus extracting oxygen from air by removing nitrogen, and a combustor producing a combustion gas by combusting a fuel with the oxygen extracted by the oxygen producing apparatus. The combustion gas produced by the combustor is supplied to the axial-flow turbine as the working fluid to rotationally drive the axial-flow turbine. By the rotationally driven axial-flow turbine, a generator generates power. An exhaust gas exhausted from the axial-flow turbine is cooled by a cooler. Moisture in the exhaust gas cooled by the cooler is separated and removed by a moisture separator to regenerate the exhaust gas. The regenerative gas regenerated by the moisture separator is compressed by a compressor. The regenerative gas compressed by the compressor and the exhaust gas flowing toward the cooler from the axial-flow turbine heat-exchange with each other in a regenerative heat exchanger. A portion of the regenerative gas heat-exchanged in the regenerative heat exchanger is supplied to the combustor, and a remaining portion of the regenerative gas is supplied to the closing part medium passage of the axial-flow turbine as a cooling medium.

First Embodiment

Using FIG. 1 to FIG. 5, an axial-flow turbine and a power plant including the axial-flow turbine according to a first embodiment of the present invention will be described.

At first, a power plant 1 will be described using FIG. 1.

Figure 1:
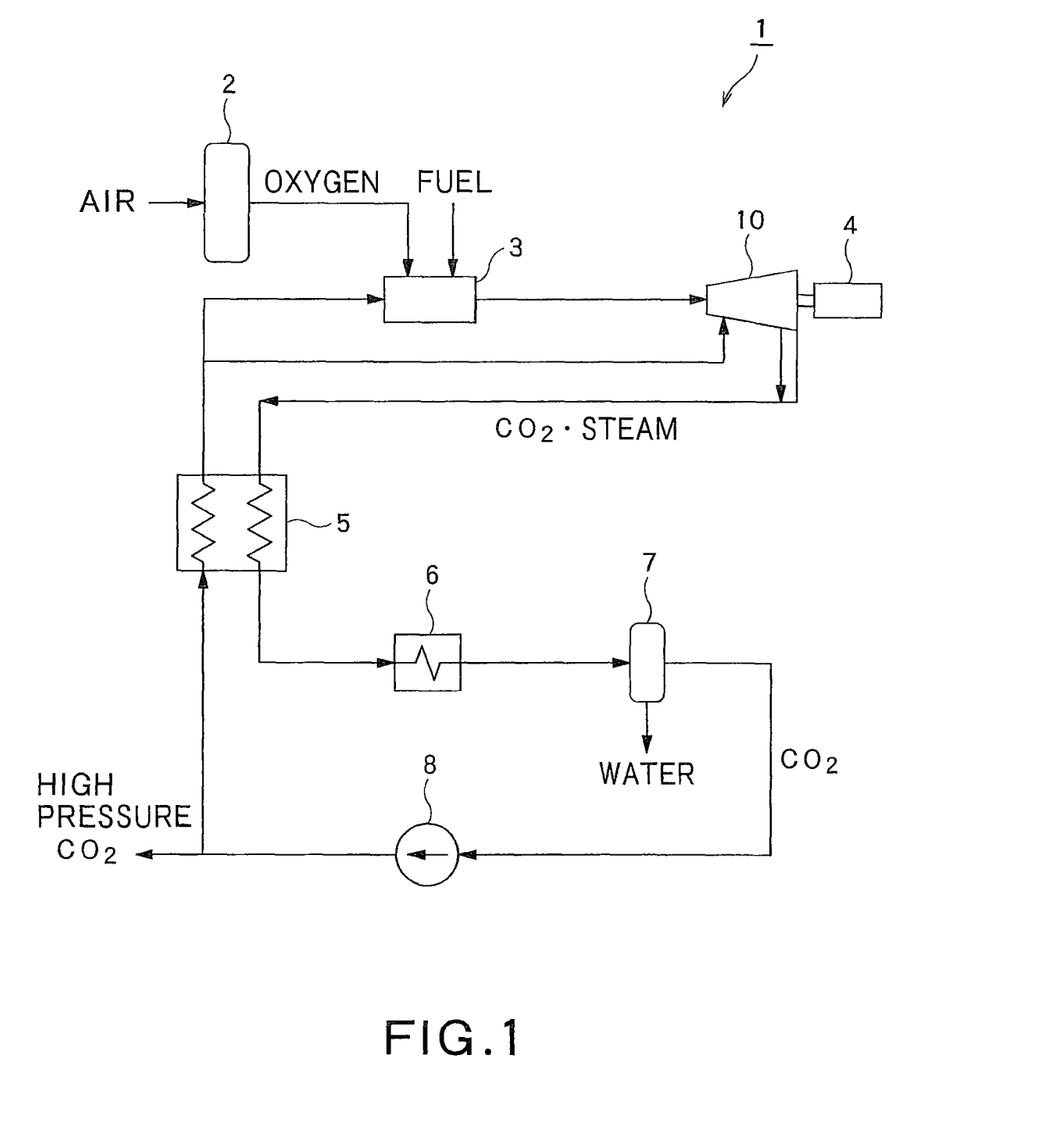
FIG. 1 is a figure illustrating a general configuration of a power plant according to a first embodiment of the present invention.
Figure 2:
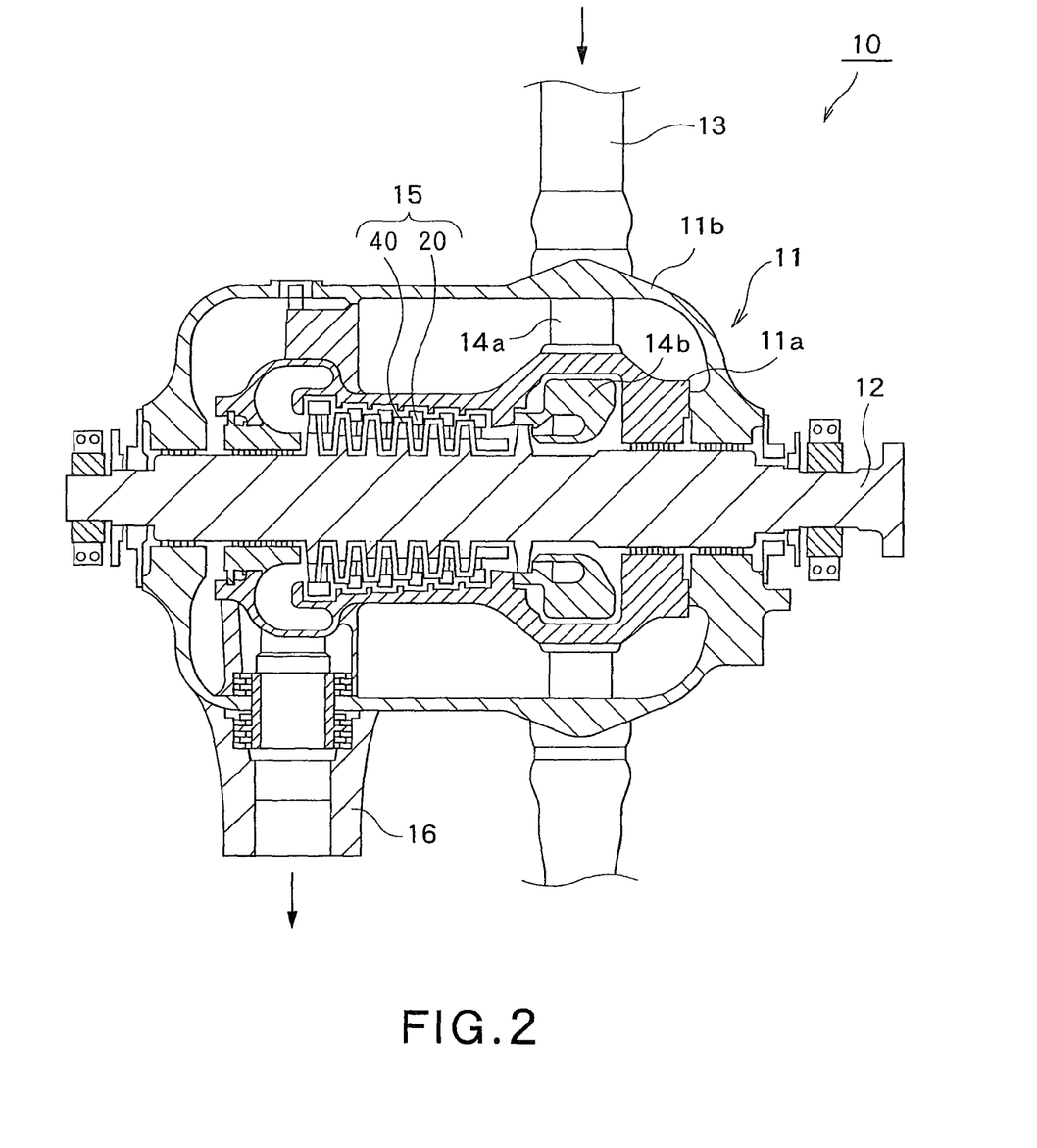
FIG. 2 is a general view illustrating an example of an axial-flow turbine used in the power plant in FIG. 1.

As illustrated in FIG. 1, the power plant 1 includes an oxygen producing apparatus 2 extracting oxygen from air by removing nitrogen, a combustor 3 producing a combustion gas, and an axial-flow turbine 10 having a turbine rotor 12 (see FIG. 2). The axial-flow turbine 10 is rotationally driven by the combustion gas which is produced by the combustor 3 and is supplied to the axial-flow turbine 10 as a working fluid.

It is configured that the oxygen extracted by the oxygen producing apparatus 2 is supplied to the combustor 3, and the combustor 3 produces the combustion gas by combusting the oxygen with a fuel. The fuel used in the combustor 3 can be, for example, natural gas free of nitrogen such as methane gas. Since the air from which nitrogen is removed, that is, oxygen, is used for the combustion of the fuel, the combustion gas produced in the combustor 3 includes $CO_2$ gas and steam. Namely, components of the combustion gas are $CO_2$ (carbon dioxide) and water. Therefore, inclusion of a gas such as SOx (sulfur oxide) and NOx (nitrogen oxide) in the combustion gas can be suppressed.

The combustor 3 is configured to produce high temperature combustion gas. The combuster 3 preferably produces the combustion gas having a temperature of, for example, 600 □C or higher. In this manner, improvement in power generation efficiency and suppression of an amount of generated gas such as $CO_2$ can be achieved. Further, it is configured that from a regenerative heat exchanger 5 which will be described below, a portion of the regenerative gas (specifically, $CO_2$ gas, that is, a gas having $CO_2$ as a component) heated in the regenerative heat exchanger 5 is supplied to the combustor 3, and the fuel is combusted with the supplied regenerative gas.

The combustion gas performed by the combustor 3 is supplied to the axial-flow turbine 10 as a working fluid to perform work against a blade 41 (see FIG. 3) which will be described below to rotationally drive the turbine rotor 12. A generator 4 is connected to the turbine rotor 12 of the axial-flow turbine 10, and generates power by the rotationally driven turbine rotor 12.

The combustion gas which produced work in the axial-flow turbine 10 is exhausted from the axial-flow turbine 10 as an exhaust gas. The exhaust gas includes $CO_2$ gas and steam. Namely, components of the exhaust gas are also $CO_2$ and water. The exhaust gas is supplied to the regenerative heat exchanger 5 provided in the downstream side of the axial-flow turbine 10. It is configured that from a $CO_2$ pump (compressor) 8 which will be described below, the regenerative gas with relatively low temperature is supplied to the regenerative heat exchanger 5. In this manner, the regenerative gas and the exhaust gas exchange heat with each other in the regenerative heat exchanger 5 so that the exhaust gas with relatively high temperature is cooled.

In the downstream side of the regenerative heat exchanger 5, a cooler 6 is provided. The exhaust gas cooled in the regenerative heat exchanger 5 is supplied to the cooler 6 and the cooler 6 further cools the exhaust gas.

In the downstream side of the cooler 6, a moisture separator 7 is provided. The exhaust gas cooled by the cooler 6 is supplied to the moisture separator 7, and the moisture separator 7 separates and removes moisture in the exhaust gas. In this manner, moisture is removed from the exhaust gas which has $CO_2$ and water as a component, thereby regenerating the exhaust gas. Namely, the exhaust gas is regenerated into a regenerative gas having $CO_2$ as a component.

In the downstream side of the moisture separator 7, a $CO_2$ pump 8 is provided. The regenerative gas regenerated by the moisture separator 7 is supplied to the $CO_2$ pump 8. The $CO_2$ pump 8 compresses the regenerative gas to raise the pressure of the regenerative gas.

The compressed regenerative gas is supplied to the regenerative heat exchanger 5 described above. In the regenerative heat exchanger 5, as described above, heat is exchanged between the regenerative gas compressed by the $CO_2$ pump 8 and the exhaust gas flowing from the axial-flow turbine 10 toward the cooler 6. In this manner, the regenerative gas having relatively low temperature is heated. A portion of the regenerative gas compressed by the $CO_2$ pump 8 is recovered without being supplied to the regenerative heat exchanger 5. The recovered regenerative gas is stored, or used for other purposes (e.g., used for increasing the amount of oil produced by oil-drilling).

A portion of the regenerative gas heated in the regenerative heat exchanger 5 is supplied to the combustor 3. The remaining portion is supplied to a closing part medium passage 33 of the axial-flow turbine 10 which will be described below, and used as a cooling medium.

In this manner, in the power plant 1 illustrated in FIG. 1, power is generated using the combustion gas having $CO_2$ produced by combustion and water as components, and having a temperature of 600 □C or higher. The majority of $CO_2$ is circulated and reused. In this manner, generation of NOx or SOx which is a harmful gas can be prevented. Further, an equipment for separating and recovering $CO_2$ from the exhaust gas can be not necessary. Further, the purity of recovered $CO_2$ can be raised, thereby allowing the recovered $CO_2$ to be used for various purposes other than power generation.

Now, using FIG. 2, the axial-flow turbine 10 according to this embodiment will be described. An example of a high pressure turbine in which the combustion gas pressure is relatively high will be illustrated as the axial-flow turbine 10.

As illustrated in FIG. 2, the axial-flow turbine 10 includes a casing 11 and a turbine rotor 12 rotatably provided against the casing 11. The casing 11 includes an inner casing 11a and an outer casing 11b provided in the outer side of the inner casing 11a, thereby constituting a double structured casing.

A gas supply pipe 13 is connected to the outer casing 11b so that the combustion gas produced in the combustor 3 is supplied to the axial-flow turbine 10 as a working fluid. The working fluid supplied to the axial-flow turbine 10 is guided to the turbine stage 15 in the most upstream side among a plurality of turbine stages 15 which will be described below by an inlet sleeve 14a and a nozzle box 14b which are provided in the casing 11. The generator 4 described above is connected to the turbine rotor 12.

A plurality of nozzle structures 20 is supported in the casing 11 (more particularly, an inner casing 11a). A plurality of blade structures 40 is supported by the turbine rotor 12. The nozzle structure 20 and the blade structure 40 are alternately arranged in the axial direction of the turbine rotor 12. One nozzle structure 20 and one blade structure 40 which are adjacently arranged with said one nozzle structure 20 in the downstream side thereof constitute one turbine stage 15. In the axial-flow turbine 10, a plurality of such turbine stages 15 is provided in the axial direction of the turbine rotor 12. In this manner, the working fluid supplied via the gas supply pipe 13 flows through the plurality of turbine stages 15 to perform work against the blade 41 of each turbine stage 15, thereby rotationally driving the turbine rotor 12.

The working fluid flowed through the blade 41 in the final stage is then exhausted to the outside of the axial-flow turbine 10 through an exhaust flow passage 16.

Now, using FIG. 3 to FIG. 5, the nozzle structure 20 will be described.

Figure 3:
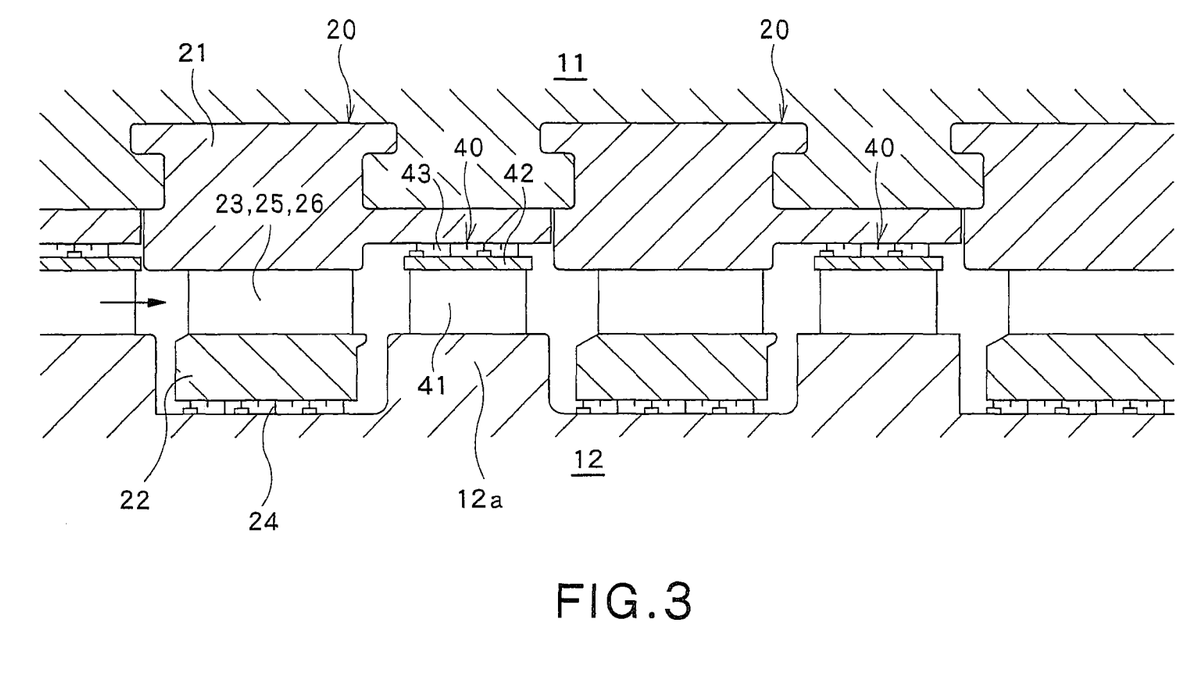
FIG. 3 is a partial cross sectional view of the axial-flow turbine in FIG. 2.

As illustrated in FIG. 3, the nozzle structure 20 includes an outer ring diaphragm 21 supported by the casing 11 and an inner ring diaphragm 22 which is provided in the inner circumferential side than the outer ring diaphragm 21. As illustrated in FIG. 3 and FIG. 4, an annular opening portion 23 extending in the circumferential direction is formed between the outer ring diaphragm 21 and the inner ring diaphragm 22. The outer ring diaphragm 21 is engaged with, and fixed to, the casing 11.

On the inner circumferential surface of the inner ring diaphragm 22, a labyrinth packing 24 is provided. The labyrinth packing 24 prevents the working fluid from flowing toward the downstream side to cause leakage between the inner ring diaphragm 22 and the turbine rotor 12.

Figure 4:
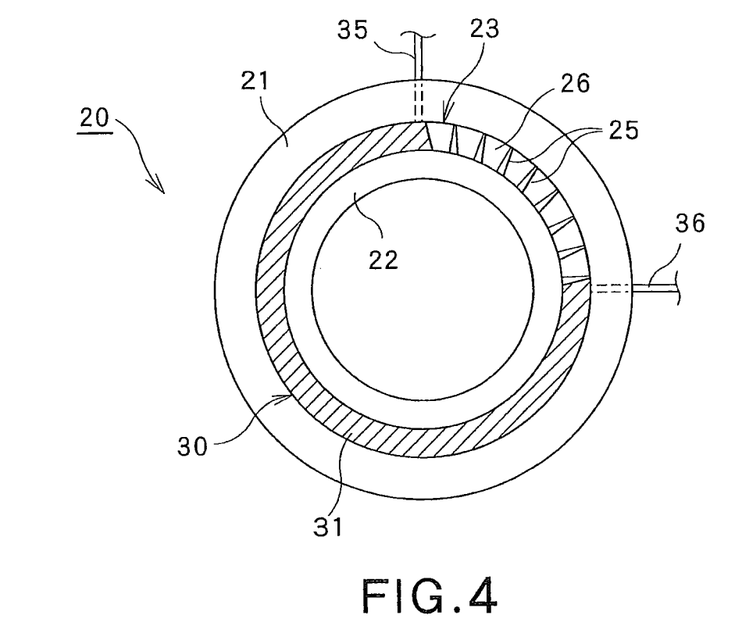
FIG. 4 is a view of the nozzle structure in FIG. 3 viewed from the axial direction of the turbine rotor.

As illustrated in FIG. 4, in a portion (one portion) of the region of the annular opening portion 23 in the circumferential direction described above, a plurality of nozzles (stator vanes) 25 is provided. In the one portion of the region, the plurality of nozzles 25 is arranged in a row in the circumferential direction. The one portion of the region in which the nozzle 25 is arranged forms a fan-shaped (or segment-shaped) nozzle opening portion 26. The working fluid flows into the nozzle opening portion 26.

In another portion (second portion) of the region in the circumferential direction of the annular opening portion 23, a closing part 30 is provided. The closing part 30 is provided to close the second portion of the region and prevent the working fluid from flowing into said second portion of the region. Such structure is called the partial admission structure. The partial admission structure is preferably applied to each nozzle structure 20. In this case, the circumferential location of the closing part 30 in a nozzle structure 20 may preferably be arranged to be shifted, to the opposite direction to the rotational direction of the turbine rotor 12, from the location of the closing part 30 of the nozzle structure 20 which is in the upstream side of the former nozzle structure 20.

In this embodiment, the closing part 30 includes a pair of closing plates 31 arranged apart from each other in the axial direction of the turbine rotor 12. One closing plate 31 is arranged in the upstream side and the other closing plate 31 is arranged in the downstream side. A closed space 32 is formed between the pair of closing plates 31.

In each closing part 30, a closing part medium passage 33, through which a cooling medium which cools the closing part 30 flows, is provided. In this embodiment, a cooling pipe 34 including the closing part medium passage 33 is arranged in the closed space 32 described above. In other words, the cooling pipe 34 including the closing part medium passage 33 is provided on the inner surface of each closing plate 31 (the surface facing the other closing plate 31). The cooling pipe 34 is preferably in contact with the inner surface of the corresponding closing plate 31 so that cooling efficiency can be improved. Further, the cooling pipe 34 is formed to extend in the circumferential direction, that is, formed to extend from one circumferential end portion to the other circumferential end portion of the closing part 30.

As illustrated in FIG. 4, a medium supply pipe 35 which supplies the cooling medium is connected to the cooling pipe 34 including the closing part medium passage 33. The medium supply pipe 35 is formed to penetrate the outer ring diaphragm 21 in the radial direction. Further, a portion of the regenerative gas is supplied to the medium supply pipe 35 from the regenerative heat exchanger 5 illustrated in FIG. 1, and the supplied regenerative gas is used as a cooling medium. The cooling medium is a gas having $CO_2$ as a component.

Further, a medium discharge pipe 36 which discharges the cooling medium from the closing part medium passage 33 is connected to the cooling pipe 34 including the closing part medium passage 33. The medium discharge pipe 36 is formed to penetrate the outer ring diaphragm 21 in the radial direction. The cooling medium discharged from the medium discharge pipe 36 is transferred, together with the exhaust gas exhausted from the axial-flow turbine 10, to the regenerative heat exchanger 5 illustrated in FIG. 1.

Figure 5:
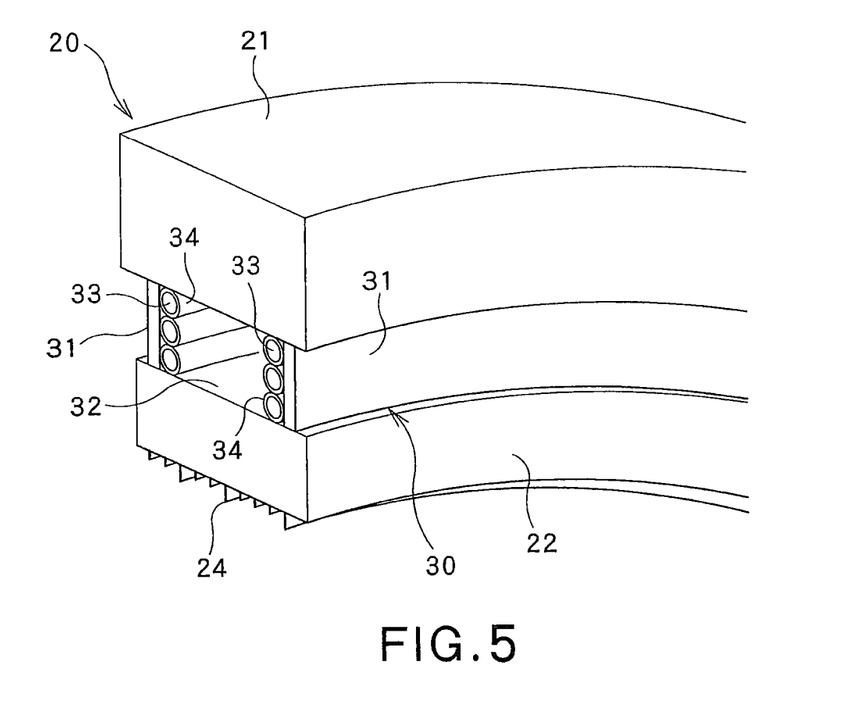
FIG. 5 is a partial perspective view of the nozzle structure in FIG. 3.

In the configuration illustrated in FIG. 5, a plurality of cooling pipes 34 is provided on the inner surface of each closing plate 31. In this case, each closing plate 31 can uniformly be cooled. The plurality of cooling pipes 34 may be connected to the medium supply pipe 35 and the medium discharge pipe 36 in parallel, or in series. That is, the cooling medium may flow through the plurality of cooling pipes 34 in parallel, or the cooling medium may flow through the plurality of cooling pipes 34 in series (each of the cooling pipes 34 one after another).

Using FIG. 3, the blade structure 40 will be described.

As illustrated in FIG. 3, the blade structure 40 includes a plurality of blades 41. That is, a stud portion 12a protruding in the outer circumferential side of the turbine rotor 12 is provided in the turbine rotor 12, and the blade 41 is fixed to the stud portion 12a. The plurality of blades 41 is arranged in a row in the circumferential direction. Such blade 41 receives work from the working fluid so as to obtain rotational energy, thereby rotating the turbine rotor 12.

On the distal end portion in the outer circumferential side of the blade 41, a snubber 42 is provided. The snubber 42 is for suppressing vibration of the turbine rotor 12. A seal fin 43 is arranged on the outer circumferential surface of the snubber 42. The seal fin 43 is for preventing the working fluid from flowing toward the downstream side to cause leakage between the outer ring diaphragm 21 (more particularly, a portion of the outer ring diaphragm 21 which extends toward the blade 41 side) and the snubber 42. The seal fin 43 is preferably provided on the outer ring diaphragm 21.

The operation of this embodiment having the configuration as described above will be described below.

When the combustion gas is supplied to the axial-flow turbine 10 via the gas supply pipe 13 (see FIG. 2) from the combustor 3 illustrated in FIG. 1 as a working fluid, the supplied working fluid is supplied to the most upstream side turbine stage 15 (see FIG. 3) through the inlet sleeve 14a and the nozzle box 14*b*. The supplied working fluid performs work against the blade 41 of said turbine stage 15, and then performs work against the blade 41 of each turbine stage 15 in the downstream side. In this manner, the turbine rotor 12 is rotationally driven.

During this process, the working fluid having a temperature of 600 □C or higher flows through the nozzle opening portion 26 (see FIG. 4) of the nozzle structure 20 of each turbine stages 15. During the process, the closing part 30 is exposed to the high temperature working fluid.

On the other hand, the cooling medium (a portion of the regenerative gas supplied from the regenerative heat exchanger 5) is supplied to the closing part medium passage 33 (see FIG. 5) of the cooling pipe 34 via the medium supply pipe 35. In this manner, the cooling medium flowing through the closing part medium passage 33 cools the closing part 30. The supplied cooling medium is the gas supplied from the regenerative heat exchanger 5 as described above. On the contrary, the working fluid is the combustion gas having a high temperature of 600 □C or higher produced from the gas which is supplied from the regenerative heat exchanger 5 to the combustor 3. In this manner, by the cooling medium having relatively low temperature, the closing part 30 which is exposed to the working fluid having relatively high temperature can efficiently be cooled.

The cooling medium which flows through the closing part medium passage 33 is transferred to the regenerative heat exchanger 5 via the medium discharge pipe 36. The cooling medium is transferred to the regenerative heat exchanger 5 together with the exhaust gas exhausted from the axial-flow turbine 10.

According to this embodiment, the closing part 30 provided in the one portion of the region of the annular opening portion 23 formed between the outer ring diaphragm 21 and the inner ring diaphragm 22 is cooled by the cooling medium flowing through the closing part medium passage 33. Thus, the rise in temperature of the closing plate 31 of the closing part 30 exposed to the high temperature working fluid can be prevented, so that burnout of the closing plate 31 can be prevented and the closing plate 31 can be kept in good condition. Consequently, the axial-flow turbine 10 including the partial admission structure which allows raising the temperature of the working fluid, and the power plant 1 including the axial-flow turbine 10 can be obtained.

Further, according to this embodiment, as a cooling medium which cools the closing plate 31 of the closing part 30, the regenerative gas having CO2 as a component supplied from the regenerative heat exchanger 5 is used. Therefore, the cooling medium can easily be acquired, thereby restraining complication of the power plant 1 caused by providing equipment or the like for acquiring the cooling medium.

Consequently, in this embodiment, it is possible to provide the axial-flow turbine in which, while the second portion of the region of the annular opening portion formed between the outer ring diaphragm and the inner ring diaphragm is closed, the temperature of the working fluid can be raised, and the power plant including said axial-flow turbine.

In this embodiment described above, there is described the example in which the cooling pipe 34 including the closing part medium passage 33 is provided on the inner surface of each closing plate 31 of the closing part 30. However, it is not limited to this configuration, and the cooling pipe 34 may be provided on the outer surface of each closing plate 31. Also in this case, the rise in temperature of the closing plate 31 can be prevented, so that the burnout of the closing plate 31 can be prevented.

Further, in this embodiment described above, there is described the example in which the cooling pipe 34 including the closing part medium passage 33 is arranged in the closed space 32 formed between the pair of closing plates 31 of the closing part 30. However, it is not limited to this configuration, and the closed space 32 may be configured as the closing part medium passage 33. That is, the closed space 32 may be connected to the medium supply pipe 35 and the medium discharge pipe 36 so that the cooling medium flows through in the closed space 32. In this case, each closing plate 31 can directly be cooled, so that the rise in temperature of the closing plate 31 can further be prevented so that the burnout of each closing plate 31 can be further prevented.

Further, in this embodiment described above, there is described the example in which the closing part 30 includes the pair of closing plates 31. However the closing part 30 is not limited to such configuration if the second portion of the region of the annular opening portion 23 can be closed.

Second Embodiment

Using FIG. 6, an axial-flow turbine and a power plant including the axial-flow turbine according to a second embodiment of the present invention will be described.

Figure 6:
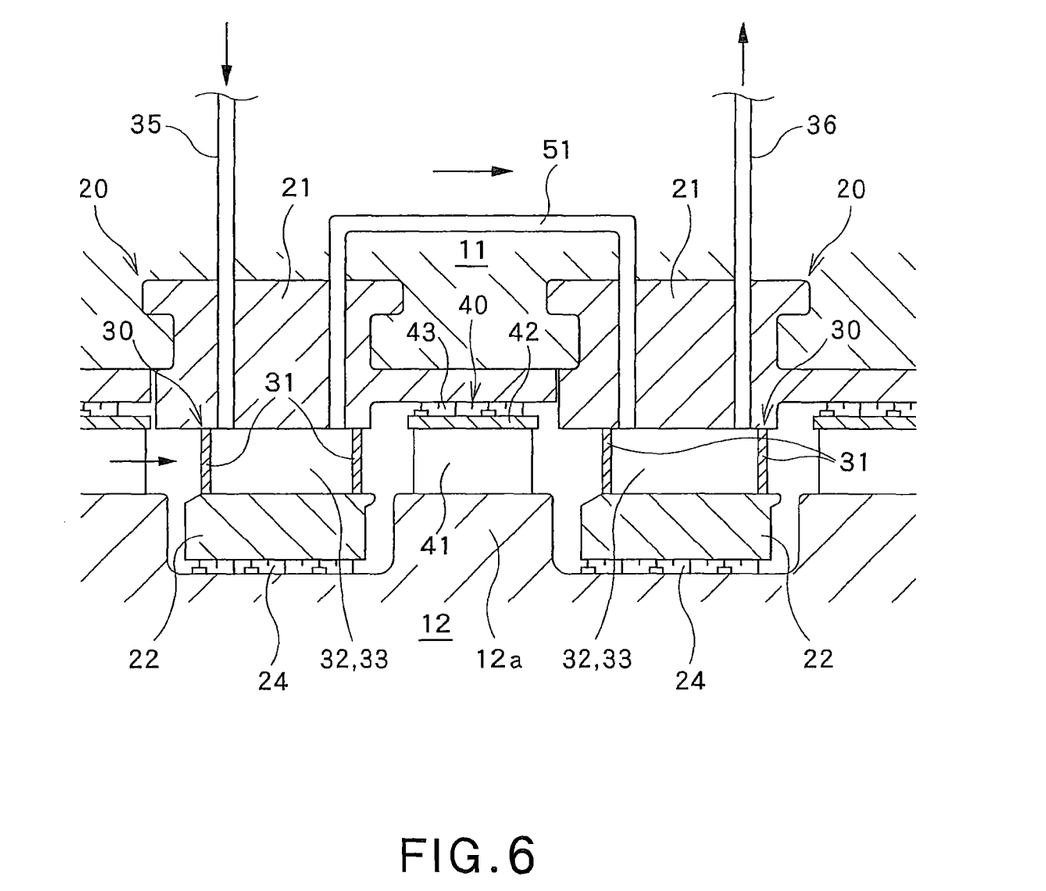
FIG. 6 is a partial cross sectional view of the axial-flow turbine according to a second embodiment of the present invention.

The second embodiment illustrated in FIG. 6 mainly differs from the first embodiment illustrated in FIG. 1 to FIG. 5 in that the closing part medium passage of one nozzle structure and the closing part medium passage of another nozzle structure are connected via a medium connecting pipe. Other configurations are approximately the same as those of the first embodiment. In FIG. 6, the component same as that of the first embodiment illustrated in FIG. 1 to FIG. 5 is appended with the same reference numeral, and the detailed description for such component is omitted.

As illustrated in FIG. 6, the closing part medium passage 33 of one nozzle structure 20 and the closing part medium passage 33 of another nozzle structure 20 are connected via the medium connecting pipe 51. The medium connecting pipe 51 preferably connects, for example, the closing part medium passage 33 of the nozzle structure 20 in the upstream side with the closing part medium passage 33 of another nozzle structure 20 located adjacent to the former nozzle structure 20 in the downstream side thereof. In this case, the configuration of the medium connecting pipe 51 can be restrained from being complicated. The medium supply pipe 35 is connected to the closing part medium passage 33 of the nozzle structure 20 in the upstream side, and the medium discharge pipe 36 is connected to the closing part medium passage 33 of the nozzle structure 20 in the downstream side. Similar to the medium supply pipe 35 or the medium discharge pipe 36, the medium connecting pipe 51 is preferably formed to penetrate the outer ring diaphragm 21 in the radial direction. In this embodiment, the closing part medium passage 33 is configured with the closed space 32 formed between the pair of closing plates 31 of the closing part 30.

In the configuration illustrated in FIG. 6, the cooling medium is supplied to the closing part medium passage 33 of the nozzle structure 20 in the upstream side via the medium supply pipe 35 so that the closing part 30 of said nozzle structure 20 is cooled. The cooling medium which cools the closing part 30 in the upstream side flows through the medium connecting pipe 51 to be supplied to the closing part medium passage 33 of the nozzle structure 20 in the downstream side, thereby cooling the closing part 30 of said nozzle structure 20. The cooling medium which cools the closing part 30 in the downstream side is discharged via the medium discharge pipe 36. In order to cool the closing part 30 of the nozzle structure 20 in the downstream side, it is preferable to raise cooling capability by increasing the flow passage cross sectional area of the closing part medium passage 33, the flow passage cross sectional area of the medium supply pipe 35, and the flow passage cross sectional area of the medium discharge pipe 36 so as to increase the flow rate of the cooling medium flowing through the closing part medium passage 33.

According to this embodiment as described above, the cooling medium which cools the closing part 30 of the nozzle structure 20 in the upstream side can cool the closing part 30 of the nozzle structure 20 in the downstream side. Therefore, the total amount of the cooling medium used for cooling every closing part 30 of the axial-flow turbine 10 can be reduced, thereby enabling improvement of the overall efficiency of the power plant 1.

In this embodiment described above, there is described the example in which the medium connecting pipe 51 connects the closing part medium passage 33 of one nozzle structure 20 with the closing part medium passage 33 of another nozzle structure 20 located adjacent to the former nozzle structure 20 in the downstream side thereof. However, it is not limited to this configuration in which two nozzle structures 20 connected with each other by the medium connecting pipe 51 are adjacent to each other. Further, it may be configured that another medium connecting pipe is connected to the closing part medium passage 33 of the nozzle structure 20 in the downstream side, to which the medium connecting pipe 51 is connected, so that the cooling medium is supplied to the closing part medium passage 33 of the nozzle structure 20 in further downstream of the former closing part medium passage 33.

In this embodiment described above, there is described the example in which the medium supply pipe 35 is connected to the closing part medium passage 33 of the nozzle structure 20 in the upstream side, and the medium discharge pipe 36 is connected to the closing part medium passage 33 of the nozzle structure 20 in the downstream side. However, it is not limited to this configuration, and the medium supply pipe 35 may be connected to the closing part medium passage 33 of the nozzle structure 20 in the downstream side, and the medium discharge pipe 36 may be connected to the closing part medium passage 33 of the nozzle structure 20 in the upstream side.

Third Embodiment

Using FIG. 7, an axial-flow turbine and a power plant including the axial-flow turbine according to a third embodiment of the present invention will be described.

Figure 7:
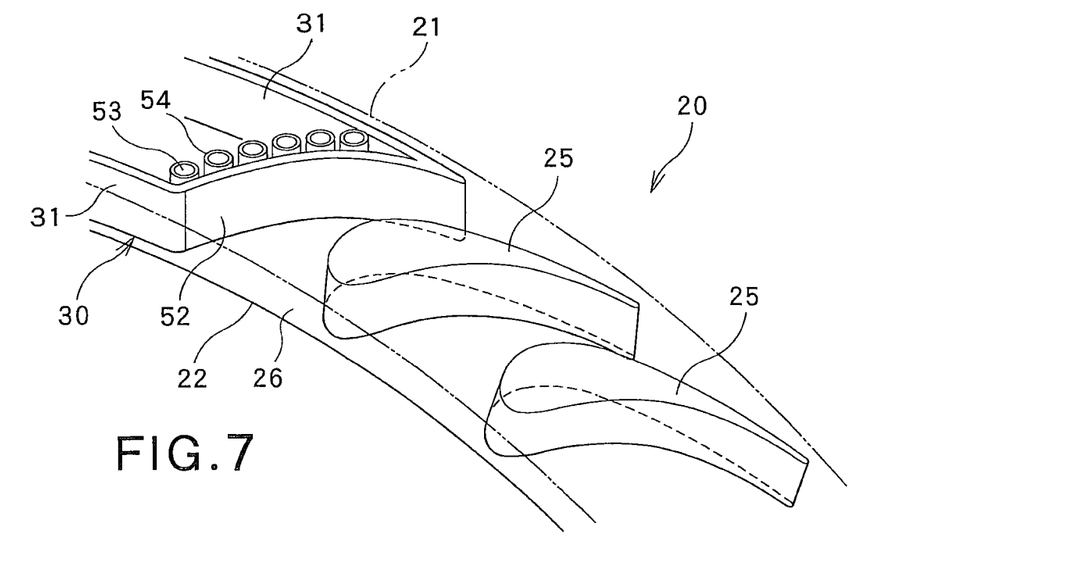
FIG. 7 is a perspective view illustrating a circumferential end portion of a closing part according to a third embodiment of the present invention.

The third embodiment illustrated in FIG. 7 mainly differs from the first embodiment illustrated in FIG. 1 to FIG. 5 in that the second cooling pipe including the second closing part medium passage is provided on the inner surface of the end plate of the closing part. Other configurations are approximately the same as those of the first embodiment. In FIG. 7, the component same as that of the first embodiment illustrated in FIG. 1 to FIG. 5 is appended with the same reference numeral, and the detailed description for such component is omitted.

As illustrated in FIG. 7, the closing part 30 further includes the end plate 52 which defines the circumferential end portion of the closing part 30. More specifically, the circumferential end portions of the pair of closing plates 31 are connected to each other with the end plate 52. The end plate 52 preferably has an airfoil shape corresponding to the shape of the adjacent nozzle 25. In this case, the loss occurring in the working fluid flowing through the nozzle opening portion 26 can be suppressed.

On the inner surface of the end plate 52, the second cooling pipe 54 including the second closing part medium passage 53 is provided. The cooling medium which cools the end plate 52 flows through the second closing part medium passage 53. The second cooling pipe 54 is preferably formed to extend in the radial direction of the turbine rotor 12. The cooling pipe 34 and the second cooling pipe 54 may be connected to the medium supply pipe 35 and the medium discharge pipe 36 in parallel. In this case, the end plate 52 can efficiently be cooled. Alternatively, the cooling pipe 34 and the second cooling pipe 54 may be connected to the medium supply pipe 35 and the medium discharge pipe 36 in series.

According to this embodiment as described above, the end plate 52 of the closing part 30 is cooled by the cooling medium flowing through the second closing part medium passage 53. Therefore, the end plate 52 of which temperature can relatively be high in the closing parts 30, by being exposed to the working fluid flowing through the nozzle opening portion 26, can efficiently be cooled. Therefore, the closing part 30 can further be kept in good condition.

Further, according to this embodiment, the second cooling pipe 54 extends in the radial direction of the turbine rotor 12. Therefore, the cooling capability of the end plate 52 can be raised, thereby further efficiently cooling the end plate 52.

Fourth Embodiment

Using FIG. 8, an axial-flow turbine and a power plant including the axial-flow turbine according to a fourth embodiment of the present invention will be described.

Figure 8:
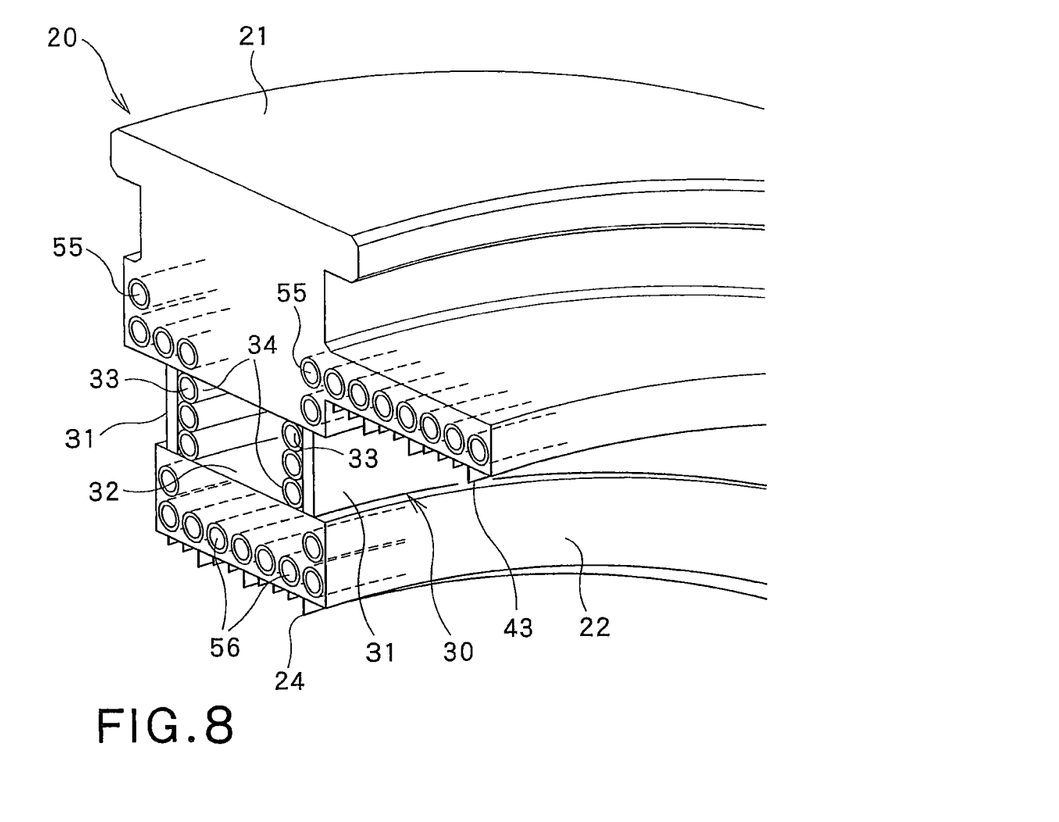
FIG. 8 is a partial perspective view illustrating a nozzle structure according to a fourth embodiment of the present invention.

The major difference of the fourth embodiment illustrated in FIG. 8 is that an outer ring medium passage which cools the outer ring diaphragm and an inner ring medium passage which cools the inner ring diaphragm are provided. Other configurations are approximately the same as those of the first embodiment illustrated in FIG. 1 to FIG. 5. In FIG. 8, the component same as that of the first embodiment illustrated in FIG. 1 to FIG. 5 is appended with the same reference numeral, and the detailed description for the component is omitted.

As illustrated in FIG. 8, the outer ring medium passage 55 through, which the cooling medium which cools the outer ring diaphragm 21, flows is provided in the outer ring diaphragm 21. As illustrated in FIG. 8, a plurality of outer ring medium passages 55 is preferably provided in the outer ring diaphragm 21 and formed to extend in approximately circumferential direction. Also, the outer ring medium passage 55 is preferably arranged in the vicinity of the surface of the outer ring diaphragm 21 so as to efficiently cool the outer ring diaphragm 21. Further, the outer ring diaphragm 21 may be configured with a plurality of outer ring diaphragm segments which are divided in the circumferential direction. In this case, the outer ring medium passage 55 may be formed in each outer ring diaphragm segment and may be formed in an approximately V-shape when the outer ring medium passage 55 is viewed from the axial direction of the turbine rotor 12. FIG. 8 illustrates a perspective view of the nozzle structure 20 including a cut section by which each type of the cooling passage can be viewed.

Similarly, the inner ring medium passage 56, through which the cooling medium which cools the inner ring diaphragm 22 flows, is provided in the inner ring diaphragm 22. As illustrated in FIG. 8, a plurality of the inner ring medium passages 56 is preferably provided in the inner ring diaphragm 22 and formed to extend in approximately circumferential direction. The inner ring medium passage 56 is preferably arranged in the vicinity of the surface of the inner ring diaphragm 22 so as to efficiently cool the inner ring diaphragm 22. Further, the inner ring diaphragm 22 may be configured with a plurality of inner ring diaphragm segments which are divided in the circumferential direction. In this case, the inner ring medium passage 56 may be formed in each inner ring diaphragm segment and may be formed in an approximately V-shape when the inner ring medium passage 56 is viewed from the axial direction of the turbine rotor 12.

The medium supply pipe 35 and the medium discharge pipe 36 are connected to the outer ring medium passage 55 and the inner ring medium passage 56. The outer ring medium passage 55 and the closing part medium passage 33 may be connected to the medium supply pipe 35 and the medium discharge pipe 36 in series. In this case, the total amount of the cooling medium to be used can be reduced, thereby enabling to improve the overall efficiency of the power plant 1. Further, the outer ring medium passage 55 and the closing part medium passage 33 may be connected to the medium supply pipe 35 and the medium discharge pipe 36 in parallel. In this case, the outer ring diaphragm 21 and the closing part 30 can efficiently be cooled, respectively. The inner ring medium passage 56 may preferably be connected to the medium supply pipe 35 and the medium discharge pipe 36, in a similar manner to the outer ring medium passage 55.

According to this embodiment as described above, the outer ring diaphragm 21 is cooled by the cooling medium flowing through the outer ring medium passage 55. Therefore, the outer ring diaphragm 21 is cooled, thereby further preventing the rise in temperature of the closing part 30. Further, the inner ring diaphragm 22 is cooled by the cooling medium flowing through the inner ring medium passage 56. Therefore, the inner ring diaphragm 22 can be cooled, thereby further preventing the rise in temperature of the closing part 30.

Fifth Embodiment

Using FIG. 9, an axial-flow turbine and a power plant including the axial-flow turbine according to a fifth embodiment of the present invention will be described.

Figure 9:
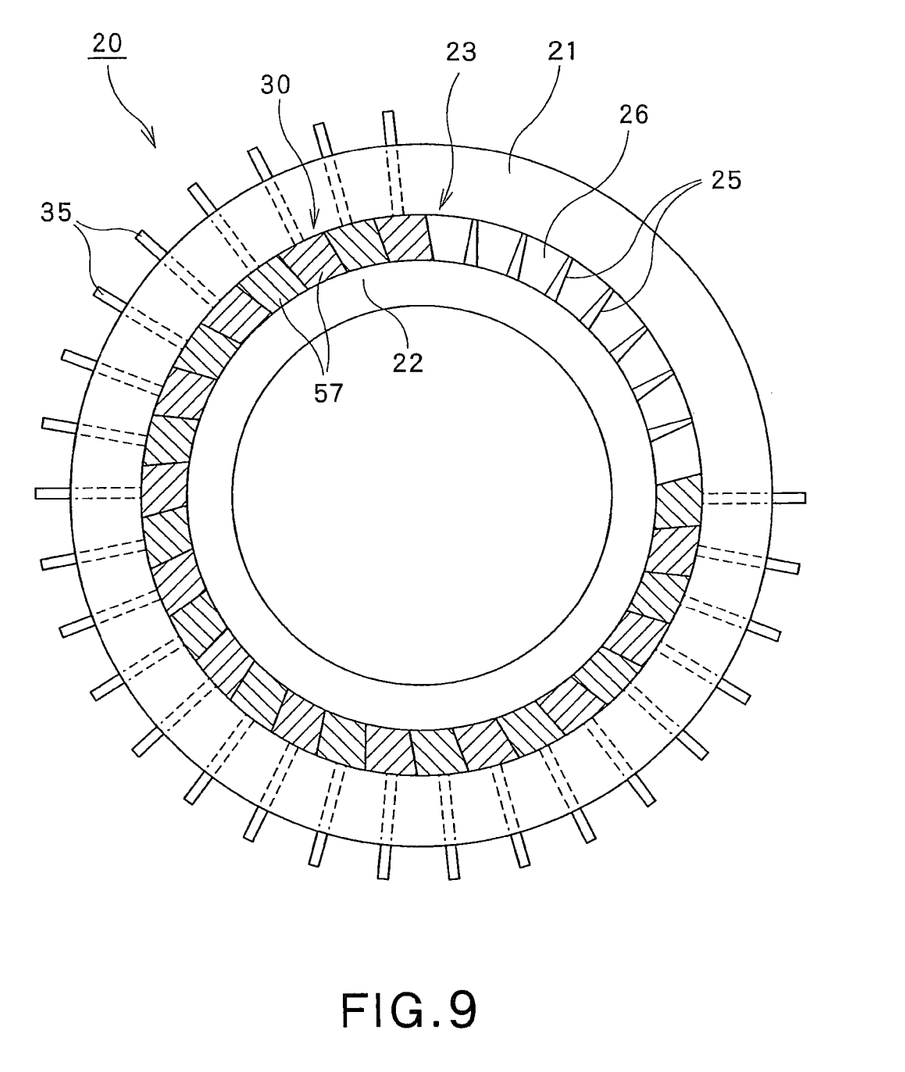
FIG. 9 is a view of a nozzle structure viewed from the axial direction of the turbine rotor according to a fifth embodiment of the present invention.

The major difference of the fifth embodiment illustrated in FIG. 9 is that the closing part includes a plurality of closing part segments divided in the circumferential direction, and the closing part medium passage is provided to each closing part segment. Other configurations are approximately the same as those of the first embodiment illustrated in FIG. 1 to FIG. 5. In FIG. 9, the component same as that of the first embodiment illustrated in FIG. 1 to FIG. 5 is appended with the same reference numeral, and the detailed description for the component is omitted.

As illustrated in FIG. 9, the closing part 30 includes the plurality of closing part segments 57 divided in the circumferential direction. The plurality of closing part segments 57 is arranged in series.

The closing part medium passage 33 is provided in each closing part segment 57. The medium supply pipe 35 and the medium discharge pipe 36 are connected to each closing part medium passage 33. That is, each closing part medium passage 33 is connected to the medium supply pipe 35 and the medium discharge pipe 36 in parallel. In this embodiment illustrated in FIG. 9, the shape of the closing part segment 57 is formed along the inlet shape (or an outlet shape) of the nozzle 25 as an example. However, it is not limited to this configuration. For example, the closing part segment 57 may be formed along the radial direction of the turbine rotor 12. Further, in FIG. 9, the medium discharge pipe 36 is omitted for clarification of the drawing.

According to this embodiment as described above, the closing part medium passage 33 is provided in each closing part segment 57 divided in the circumferential direction. Therefore, each closing part segment 57 can independently be cooled. Further, when replacement of a portion of the closing part 30 is required, the closing part segment 57 which needs replacement may be replaced, and this allows improvement of maintenance.

According to this embodiment, the medium supply pipe 35 and the medium discharge pipe 36 are connected to each closing part medium passage 33. Therefore, cooling capability of each closing part segment 57 can independently be adjusted. For example, by varying the flow passage cross sectional area of each closing part medium passage 33, the flow rate of the cooling medium which flows through each closing part medium passage 33 can be adjusted, thereby allowing independently adjusting the cooling capability of each closing part segment 57. Therefore, the flow rate of the cooling medium in the closing part segment 57 of which temperature is tend to rise can be increased, thereby raising the cooling capability of the closing part segment 57. As a result, the closing part 30 can further efficiently be cooled.

In this embodiment described above, there is described the example in which the closing part segment 57 is arranged in series. However, it is not limited to this configuration, and the nozzle 25 may be arranged between the closing part segments 57 to form a plurality of nozzle opening portions 26 in the circumferential direction and the working fluid may flow into each nozzle opening portion 26.

Sixth Embodiment

Using FIG. 10, an axial-flow turbine and a power plant including the axial-flow turbine according to a sixth embodiment of the present invention will be described.

Figure 10:
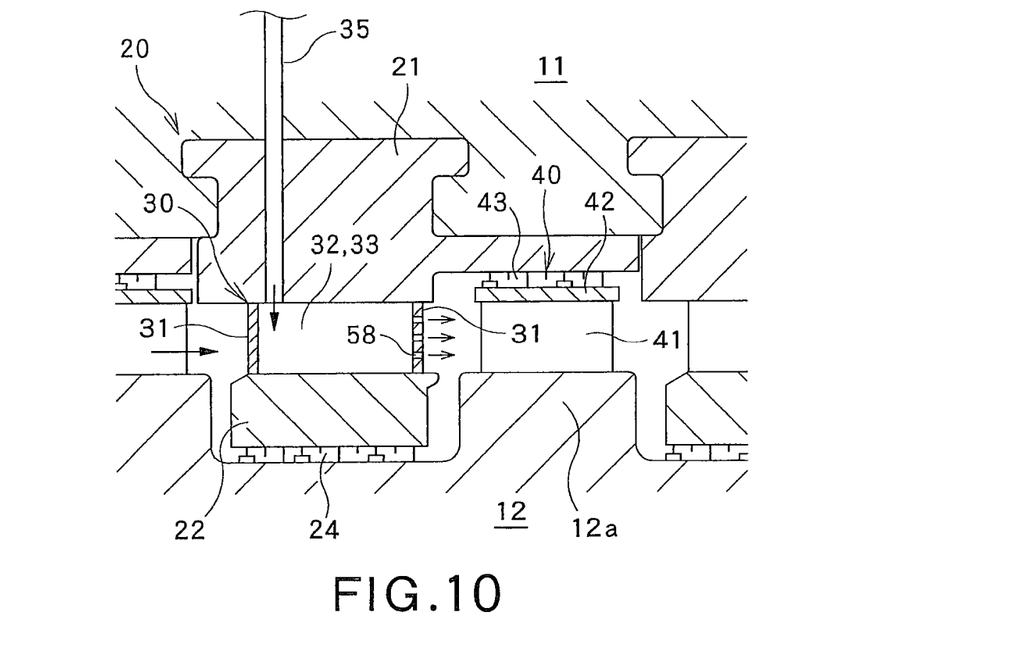
FIG. 10 is a partial cross sectional view of an axial-flow turbine according to a sixth embodiment of the present invention.

The major difference of the sixth embodiment illustrated in FIG. 10 is that a discharge hole which discharges the cooling medium in the closing part medium passage to the outside of the closing part is provided on the closing plate of the closing part. Other configurations are approximately the same as those of the first embodiment illustrated in FIG. 1 to FIG. 5. In FIG. 10, the component same as that of the first embodiment illustrated in FIG. 1 to FIG. 5 is appended with the same reference numeral, and the detailed description for the component is omitted.

As illustrated in FIG. 10, the discharge hole 58 is provided on the closing plate 31 of the closing part 30. The discharge hole 58 is configured to discharge the cooling medium in the closing part medium passage 33 to the outside of the closing part 30. That is, in this embodiment, the discharge hole 58 is provided on the downstream side closing plate 31 of the pair of the closing plates 31. The discharge hole 58 is configured to discharge the cooling medium in the closing part medium passage 33 to the downstream side of the closing part 30. In this manner, the cooling medium which cools the closing part 30 is mixed into the main flow of the working fluid. In this embodiment, the medium discharge pipe 36 is not connected to the closing part medium passage

33. Further, the closing part medium passage 33 is configured with a closed space 32 formed between the pair of closing plates 31 of the closing part 30.

According to this embodiment as described above, the cooling medium, which cools the closing part 30 by flowing through the closing part medium passage 33, is discharged through the discharge hole 58 to the outside of the closing part 30 to be mixed into the main flow of the working fluid. Therefore, the drop in efficiency of the axial-flow turbine 10 can be suppressed. That is, the cooling medium which cools the closing part 30 exchanges heat with the closing part 30 and is heated, thereby raising the temperature of the cooling medium. If the cooling medium with raised temperature is discharged from the axial-flow turbine 10 without producing work against the blade 41, thermal energy loss may occur. Thus, by mixing the cooling medium with raised temperature with the main flow of the working fluid, the thermal energy of the cooling medium can efficiently be used for rotationally driving the turbine rotor 12, thereby enabling to suppress the drop of efficiency of the axial-flow turbine 10. In this embodiment, in order to adjust the temperature of the cooling medium discharged from the discharge hole 58 close to the working fluid temperature, the flow passage cross sectional area of the closing part medium passage 33, the flow passage cross sectional area of the medium supply pipe 35, or the flow passage cross sectional area of the medium discharge pipe 36 may preferably be reduced. In this case, the flow rate of the cooling medium, which flows through the closing part medium passage 33, can be decreased, thereby suppressing the cooling capability of the closing part 30.

In this embodiment described above, there is described the example in which the discharge hole 58 discharges the cooling medium in the closed space 32 formed between the pair of closing plates 31 of the closing part 30. However, it is not limited to this configuration. For example, the discharge hole 58 may be configured to discharge the cooling medium which flows through the closing part medium passage 33 of the cooling pipe 34 as illustrated in FIG. 5. Also in this case, the drop in efficiency of the axial-flow turbine 10 can be suppressed.

Further, in this embodiment described above, the cooling medium, which flows through the outer ring medium passage 55 illustrated in FIG. 8 to cool the outer ring diaphragm 21, may be discharged outside from the discharge hole 58. Further, the cooling medium, which flows through the inner ring medium passage 56 to cool the inner ring diaphragm 22, may be discharged outside from the discharge hole 58. Also in this case, by efficiently using the thermal energy of the cooling medium, the drop in efficiency of the axial-flow turbine 10 can be suppressed.

Seventh Embodiment

Using FIG. 11, an axial-flow turbine and a power plant including the axial-flow turbine according to a seventh embodiment of the present invention will be described.

Figure 11:
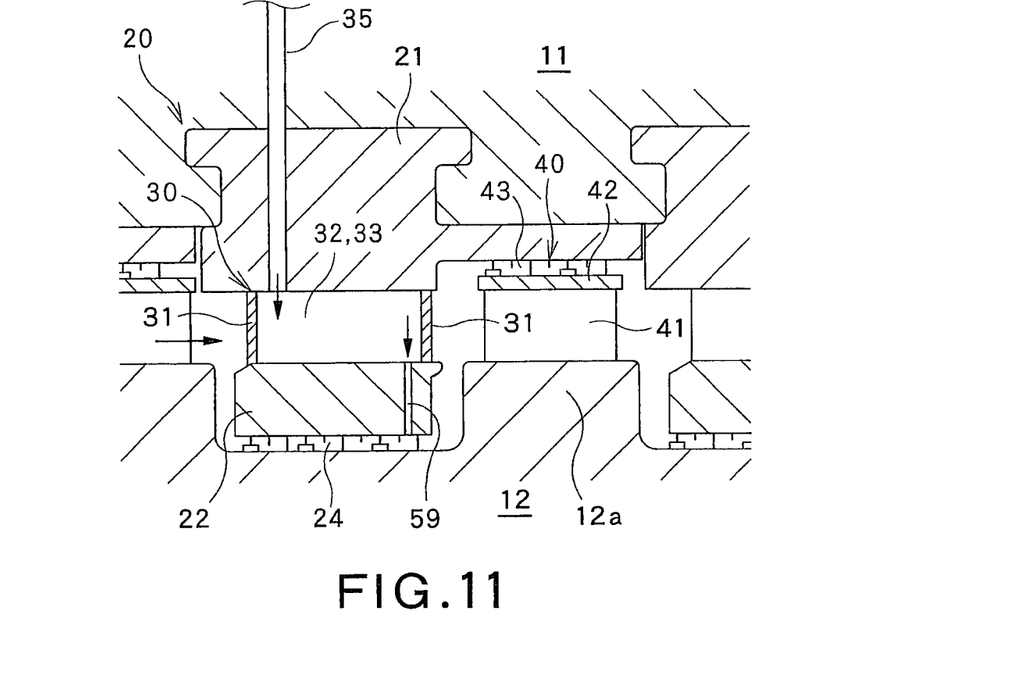
FIG. 11 is a partial cross sectional view of an axial-flow turbine according to a seventh embodiment of the present invention.

The major difference of the seventh embodiment illustrated in FIG. 11 is that a medium discharge passage discharges the cooling medium into a region between the inner ring diaphragm and the turbine rotor. Other configurations are approximately the same as those of the first embodiment illustrated in FIG. 1 to FIG. 5. In FIG. 11, the component same as that of the first embodiment illustrated in FIG. 1 to FIG. 5 is appended with the same reference numeral, and the detailed description for the component is omitted.

As illustrated in FIG. 11, the medium discharge passage 59 of this embodiment, which can be constituted by a pipe or hole, for example, is configured so as to discharge the cooling medium into the region between the inner ring diaphragm 22 and the turbine rotor 12. The medium discharge passage 59 is formed to penetrate the inner ring diaphragm 22 in the radial direction. In this manner, the cooling medium discharged by the medium discharge passage 59 is discharged into the region in which the labyrinth packing 24 is formed. In this embodiment, the closing part medium passage 33 is configured with the closed space 32 formed between the pair of closing plates 31 of the closing part 30.

According to this embodiment as described above, the cooling medium, which flows through the closing part medium passage 33 to cool the closing part 30, is discharged, through the medium discharge passage 59, into the region in which the labyrinth packing 24 is formed. Therefore, in the region in which the labyrinth packing 24 is formed, the working fluid is prevented from flowing toward the downstream side. That is, the amount of leakage of the working fluid can be reduced. Therefore, the flow rate of the working fluid (main flow) which flows into the nozzle opening portion 26 can be increased, thereby allowing to improve the efficiency of the axial-flow turbine 10.

In this embodiment described above, there is described the example in which the medium discharge passage 59 discharges the cooling medium into the closed space 32 formed between the pair of closing plates 31 of the closing part 30. However, it is not limited to this configuration. For example, the medium discharge passage 59 may be configured to discharge the cooling medium which flows through the closing part medium passage 33 of the cooling pipe 34 as illustrated in FIG. 5. Also in this case, the flow rate of the working fluid which flows into the nozzle opening portion 26 can be increased, thereby allowing to improve the efficiency of the axial-flow turbine 10.

Further, in this embodiment described above, there is described the example in which the cooling medium, which flows through the closing part medium passage 33 to cool the closing part 30, is discharged, from the medium discharge passage 59, into the region in which the labyrinth packing 24 is formed. However, it is not limited to this configuration, and it may be configured that the cooling medium, which flows through the outer ring medium passage 55 to cool the outer ring diaphragm 21, is discharged, from the medium discharge passage 59, into the region in which the labyrinth packing 24 is formed. Further, it may be configured that the cooling medium, which flows through the inner ring medium passage 56 to cool the inner ring diaphragm 22, is discharged, from the medium discharge passage 59, into the region in which the labyrinth packing 24 is formed. Also in this case, the flow rate of the working fluid which flows into the nozzle opening portion 26 can be increased, thereby allowing to improve the efficiency of the axial-flow turbine 10.

Eighth Embodiment

Using FIG. 12 and FIG. 13, an axial-flow turbine and a power plant including the axial-flow turbine according to an eighth embodiment of the present invention will be described.

Figure 12:
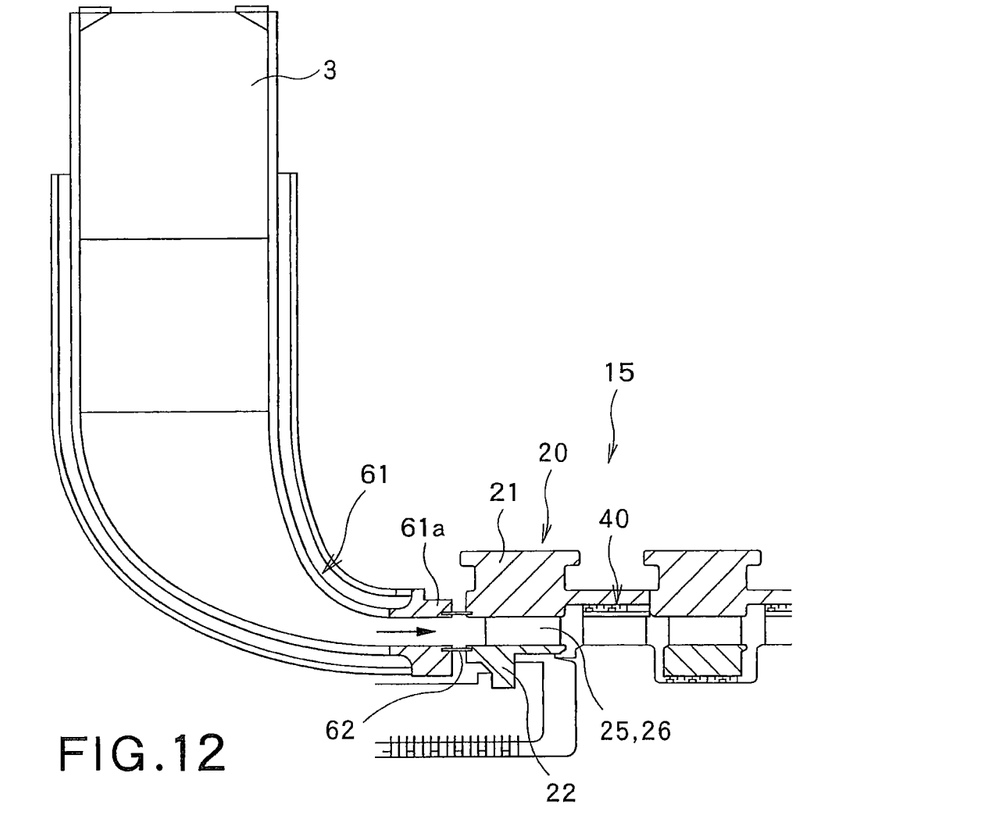
FIG. 12 is a partial cross sectional view of an axial-flow turbine according to a eighth embodiment of the present invention.
Figure 13:
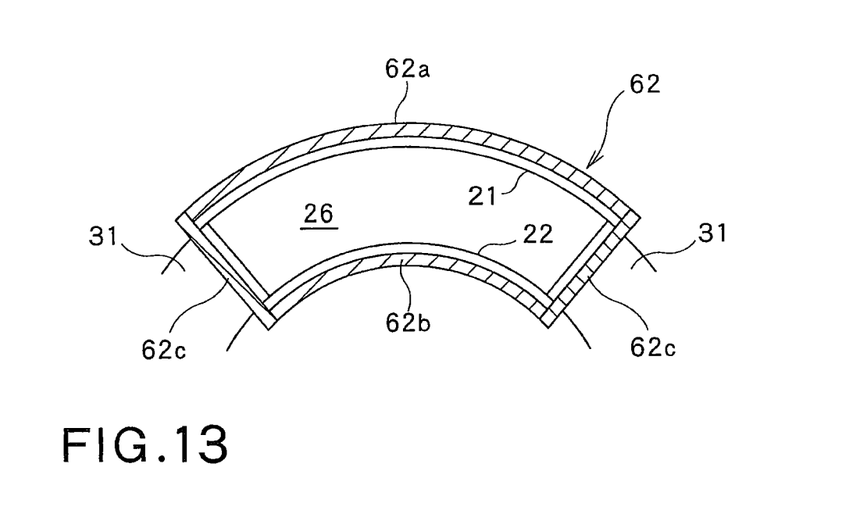
FIG. 13 is a cross sectional view of the seal connecting portion in FIG. 12 viewed from the upstream side.

The major difference of the eighth embodiment illustrated in FIG. 12 and FIG. 13 is that a flow guiding portion which guides the combustion gas produced by the combustor to the nozzle of the nozzle structure arranged in the most upstream side is provided. Other configurations are approximately the same as those of the first embodiment illustrated in FIG. 1 to FIG. 5. In FIG. 12 and FIG. 13, the component same as that of the first embodiment illustrated in FIG. 1 to FIG. 5 is appended with the same reference numeral, and the detailed description for the component is omitted.

As illustrated in FIG. 12, it is configured that the combustion gas produced by the combustor 3 (see FIG. 1) is guided, by a gas guiding portion (fluid guiding portion) 61, to the nozzle 25 (nozzle opening portion 26) of the nozzle structure 20 of the turbine stage 15 arranged in the most upstream side among the plurality of the nozzle structures 20, as the working fluid.

The gas guiding portion 61 includes an outlet side end portion 61a provided to the side of the nozzle structure 20. The outlet side end portion 61a is arranged in the vicinity of the nozzle structure 20 of the most upstream side turbine stage 15. Further, the outlet side end portion 61a is connected to the nozzle structure 20 via a seal connecting portion 62.

As illustrated in FIG. 12 and FIG. 13, the seal connecting portion 62 includes an outer ring side seal plate 62a which extends from the outlet side end portion 61a of the gas guiding portion 61 to the outer ring diaphragm 21, an inner ring side seal plate 62b which extends from the outlet side end portion 61a to the inner ring diaphragm 22, and a pair of end portion side seal plates 62c which extends from the outlet side end portion 61a to the circumferential end portion of the closing part 30. In this manner, the working fluid supplied from the gas guiding portion 61 is prevented from flowing toward the closing part 30, so that the working fluid can be guided to the nozzle opening portion 26.

The outer ring side seal plate 62a is preferably formed in an arc shape along the curvature of the outer ring diaphragm 21 when viewed from the axial direction of the turbine rotor 12. Similarly, the inner ring side seal plate 62b is preferably formed in an arc shape along the curvature of the inner ring diaphragm 22 when viewed from the axial direction of the turbine rotor 12. In this case, the seal connecting portion 62 is formed in a fan-shape (or segment-shape) when viewed from the axial direction of the turbine rotor 12 so as to correspond to the nozzle opening portion 26 having a fan-shape. Similar to the seal connecting portion 62, the outlet side end portion 61a of the gas guiding portion 61 is also preferably formed in a fan-shape when viewed from the axial direction of the turbine rotor 12 so as to correspond to the nozzle opening portion 26.

One end portion of each of the seal plates 62a, 62b, and 62c is configured to be inserted in a corresponding groove provided on the outlet side end portion 61a of the gas guiding portion 61. Further, the other end portion of the outer ring side seal plate 62a is configured to be inserted in a groove provided on the outer ring diaphragm 21, the other end portion of the inner ring side seal plate 62b is configured to be inserted in a groove provided on the inner ring diaphragm 22, and the other end portion of the end potion side seal plate 62c is configured to be inserted in a groove provided on the circumferential end portion of the upstream side closing plate 31 of the closing part 30. In this manner, the working fluid, which is supplied from the gas guiding portion 61 to the nozzle opening portion 26 of the nozzle structure 20 of the turbine stage 15 which is in the most upstream side, is restrained from flowing toward the closing part 30.

According to this embodiment as described above, the combustion gas produced by the combustor 3 is supplied from the outlet side end portion 61a of the guiding portion 61 to the nozzle opening portion 26 of the nozzle structure 20 of the most upstream side turbine stage 15 via the seal connecting portion 62 as the working fluid. The seal connecting portion 62 includes the outer ring side seal plate 62a, the inner ring side seal plate 62b, and the end portion side seal plate 62c. The outer ring side seal plate 62a is connected to the outer ring diaphragm 21, the inner ring side seal plate 62b is connected to the inner ring diaphragm 22, and the end portion seal plate 62c is connected to the circumferential end portion of the closing plate 31 in the upstream side of the closing part 30. Therefore, the working fluid, which is supplied from the gas guiding portion 61 to the nozzle opening portion 26 of the nozzle structure 20 of the most upstream side turbine stage 15, is restrained from flowing toward the closing part 30. Therefore, the pressure loss caused by the working fluid flowing toward the closing part 30 is suppressed, thereby enabling to suppress the drop of efficiency of the axial-flow turbine 10.

While certain embodiments have been described, these embodiments have been presented by way of example only, and are not intended to limit the scope of the inventions. Indeed, the novel axial-flow turbine and power plant described herein may be embodied in a variety of other forms; furthermore, various omissions, substitutions and changes in the form of the axial-flow turbine and power plant described herein may be made without departing from the spirit of the inventions. The accompanying claims and their equivalents are intended to cover such forms or modifications as would fall within the scope and spirit of the inventions.

In the embodiment described above, there is the example in which the combustor 3, producing the combustion gas or the working fluid which is supplied to the axial-flow turbine 10, produces combustion gas by combusting oxygen supplied from the oxygen producing apparatus 2 with fuel. However, it is not limited to this configuration, and the combustor 3 may be configured to produce combustion gas by combusting air with fuel. Further, the axial-flow turbine 10 according to the embodiment described above can be applied not only to the power plant as illustrated in FIG. 1 but also to a power plant of any configuration. Further, various kinds of liquid or gas can be used as the cooling medium if such liquid or gas can efficiently cool the closing part. It is preferable to use gas as the cooling medium since excessive expansion due to the rise in temperature can be avoided.

The invention claimed is:
1. An axial-flow turbine comprising:
a plurality of nozzle structures supported by a casing; and
a plurality of blade structures supported by a turbine rotor which is rotatable against the casing, the nozzle structure and the blade structure alternately arranged in an axial direction of the turbine rotor, wherein
at least one nozzle structure among the plurality of nozzle structures includes:
an outer ring diaphragm supported by the casing;
an inner ring diaphragm provided in an inner circumferential side of the outer ring diaphragm, the outer ring diaphragm and the inner ring diaphragm forming an annular opening portion which extends in a circumferential direction therebetween,
a nozzle provided in a portion of a region of the annular opening portion in the circumferential direction,
a closing part provided in another portion of the region of the annular opening portion in the circumferential direction, the closing part closing said other portion of the region to prevent a working fluid from flowing into said other portion of the region, and a closing part medium passage provided in the closing part, the closing part medium passage being configured to flow a cooling medium which cools the closing part.

2. The axial-flow turbine according to claim 1, wherein the closing part includes a pair of closing plates arranged apart from each other in the axial direction of the turbine rotor, and
a cooling pipe including the closing part medium passage is provided on an inner surface or an outer surface of the closing plate.

3. The axial-flow turbine according to claim 1, wherein the closing part includes a pair of closing plates arranged apart from each other in an axial direction of the turbine rotor,
a closed space is formed between the pair of closing plates, and
the closed space is constituted as the closing part medium passage.

4. The axial-flow turbine according to claim 1, wherein a medium supply pipe configured to supply the cooling medium is connected to the closing part medium passage.

5. The axial-flow turbine according to claim 1, wherein a medium discharge pipe configured to discharge the cooling medium from the closing part medium passage is connected to the closing part medium passage.

6. The axial-flow turbine according to claim 1, wherein each of the plurality of the nozzle structures includes the closing part medium passage, and
the closing part medium passage of one of the nozzle structures and the closing part medium passage of another nozzle structure are connected with each other via a medium connecting pipe.

7. The axial-flow turbine according to claim 2, wherein the closing part further includes an end plate connecting circumferential end portions of the closing plates, and
a second cooling pipe including a second closing part medium passage configured to flow a cooling medium which cools the end plate is provided on an inner surface of the end plate.

8. The axial-flow turbine according to claim 7, wherein the second cooling pipe extends in a radial direction of the turbine rotor.

9. The axial-flow turbine according to claim 1, wherein an outer ring medium passage configured to flow a cooling medium which cools the outer ring diaphragm is provided in the outer ring diaphragm.

10. The axial-flow turbine according to claim 1, wherein an inner ring medium passage configured to flow a cooling medium which cools the inner ring diaphragm is provided in the inner ring diaphragm.

11. The axial-flow turbine according to claim 1, wherein the closing part includes a plurality of closing part segments divided in the circumferential direction, and
the closing part medium passage is provided in each of the closing part segments.

12. The axial-flow turbine according to claim 1, wherein a discharge hole configured to discharge the cooling medium in the closing part medium passage to an outside of the closing part is provided in the closing part.

13. The axial-flow turbine according to claim 1, wherein a medium discharge passage configured to discharge a cooling medium from the closing part medium passage is connected to the closing part medium passage, and
the medium discharge passage is configured to discharge a cooling medium into a region between the inner ring diaphragm and the turbine rotor.

14. The axial-flow turbine according to claim 1, wherein a combustion gas produced by a combustor, as the working fluid, is guided to the nozzle of the nozzle structure arranged in a most upstream side among the plurality of the nozzle structures by a flow guiding portion,
the flow guiding portion is connected to the nozzle structure via a seal connecting portion,
the flow guiding portion includes an outlet side end portion, and
the seal connecting portion includes an outer ring side seal plate extending from the outlet side end portion to the outer ring diaphragm, an inner ring side seal plate extending from the outlet side end portion to the inner ring diaphragm, and a pair of end portion side seal plates extending from the outlet side end portion to a circumferential end portion of the closing part.

15. A power plant comprising:
an oxygen producing apparatus extracting oxygen from air by removing nitrogen,
a combustor producing a combustion gas by combusting a fuel with oxygen extracted by the oxygen producing apparatus,
the axial-flow turbine according to claim 1, the axial-flow turbine being rotationally driven by the combustion gas which is produced by the combustor and is supplied to the axial-flow turbine as the working fluid,
a generator generating power by the rotational driving of the axial-flow turbine,
a cooler cooling an exhaust gas exhausted from the axial-flow turbine,
a moisture separator separating and removing moisture in the exhaust gas which is cooled by the cooler, to regenerate the exhaust gas,
a compressor compressing the regenerative gas regenerated by the moisture separator, and
a regenerative heat exchanger heat-exchanging between the regenerative gas compressed by the compressor and the exhaust gas which flows from the axial-flow turbine toward the cooler, wherein
a portion of the regenerative gas heat-exchanged in the regenerative heat exchanger is supplied to the combustor, and a remaining portion of the regenerative gas is supplied to the closing part medium passage of the axial-flow turbine as the cooling medium.

* * * * *